United States Patent Office 3,711,321
Patented Jan. 16, 1973

3,711,321
RAPID DRYING POLYVINYL ALCOHOL COLOR COATING PROCESS
Peter G. Hibbert and Jerry C. Lofland, Wilmington, Del., assignors to E. I. du Pont de Nemours and Company, Wilmington, Del.
Filed Feb. 24, 1970, Ser. No. 13,714
Int. Cl. B44d 1/44
U.S. Cl. 117—119.6                                6 Claims

ABSTRACT OF THE DISCLOSURE

A process for producing coated articles comprising applying to a fibrous substrate an aqueous composition comprising a polyvinyl alcohol adhesive and a filler and thereafter drying the composition, the improvement wherein the adhesive comprises water-soluble polyvinyl alcohol having a degree of hydrolysis of at least about 99 percent and a 4 percent aqueous solution viscosity of 20° C. in the range of about 7.5 to 30 centipoises and wherein the instantaneous drying rate of the constant evaporation rate period of the drying step is 5–30 lbs. water/hr. ft.$^2$. Upon printing, the coated articles exhibit excellent mottle-free characteristics.

BACKGROUND OF THE INVENTION

Field of the invention

This invention relates to a polyvinyl alcohol color coating process and particularly, to a rapid drying process for coating cellulosic substrates with coating colors containing polyvinyl alcohol as the pigment binder. More particularly, the invention relates to a process for coating cellulosic substrates with polyvinyl alcohol coating colors which is characterized by an increased drying rate in the constant evaporation rate period of the coating operation.

DESCRIPTION OF THE PRIOR ART

In the preparation of a coated cellulosic web, e.g., a paper web, it is conventional practice to form a mixture of water and a pigment, such as clay or the like, sometimes with other materials such as, for example, a soluble pyrophosphate salt which may act as a dispersing and stabilizing agent. This mixture, commonly termed a pigment "slip" or, since it usually contains clay, a clay "slip," is then compounded with a binder or adhesive material to produce a composition known in the art as a coating "color," which is useful for coating a cellulosic substrate, e.g., a paper or paperboard web. Substantial quantities of the binder are used, and, accordingly, the composition and characteristics of the binder are of great importance in determining the qualities of the finished coated web. It is important that the binder impart to the coating color or to the finished coated web a high degree of brightness, smoothness and gloss, and a good finish and feel after calendering. In addition to these basic qualities required in coatings, there are several other desired characteristics, e.g., the coating color must flow smoothly and evenly so that it can be applied to the cellulosic web at sufficiently high speeds to be economical in ordinary coating processes and the coating must have high strength, to permit subsequent printing on the coated paper without "picking."

In color coating paper and paperboard products the most expensive ingredients are adhesives and opaque white pigments. Conventional clay coatings used in the printing and packaging industries usually contain between 15% and 20% adhesive based on the total dry weight of clay and pigment. This amount of adhesive has been found to be necessary to provide sufficient bond to the substrate to withstand the stresses encountered in the use of the product. For example, clay coatings must withstand handling, scuffing, printing, folding, scoring, gluing and other similar processes.

Since all of the known adhesives for clay coatings are to a greater or lesser degree resistant to oils, increasing the adhesive content decreases the ink receptivity. In addition to this, as the percent adhesive is increased the refractive index of the coating is changed so as to make the coating more transparent. This then necessitates the use of bright opaque pigments which are expensive. The adhesives generally used are particulate in nature and include casein, soya protein, starch, polymer emulsions such as acrylics, vinyl acetates and styrene butadiene.

U.S. Pat. 3,015,581 (Gallino et al.) is concerned with providing a solution to the aforementioned problems stemming from the adhesive or binder content of coating colors. The patentees teach that rapidly drying the coating colors or liquid coating composition within seven seconds after application thereof to the fibrous backing or paper web reduces penetration of the adhesive or binder into the web and is attended by advantages of reduced binder requirements, improved gloss and improved ink receptivity.

Another solution to the prior art problems associated with coating color binder content is the substitution of polyvinyl alcohol for the starch and other particulate binders used heretofore. The attractive, unique property of polyvinyl alcohol as a pigment binder for cellulosic substrates, principally paper and paperboard, is its strength. Accordingly, this property may be used to advantage by preparing color coatings exhibiting a pigment-to-substrate binding power comparable to starch-based color coatings yet containing a significantly reduced binder content. The disclosures of U.S. Pat. 3,298,987 (Colgan et al.), Canadian Pat. 794,420 (Nippon Gosei) and British Pat. 1,111,954 (Kurashiki Rayon) are pertinent in this regard.

Nothwithstanding the apparent advantages to be gained therefrom, the use of polyvinyl alcohol in place of starch and other particulate binders in coating colors has not gained widespread acceptance. This is in no small part the result of two main disadvantages. Modern methods of applying coating colors to cellulosic webs involve high speed coating operations. Accordingly, satisfactory application requirements of coating color compositions dictate smooth flow under conditions of high shear. Previous polyvinyl alcohol formulations, as disclosed in the aforementioned prior art, have been deficient in this requirement. However, U.S. Pat. 3,647,528 (Barlow) provides a solution to this problem. Barlow teaches that coating colors employing polyvinyl alcohol as the sole binder may be provided with improved rheological properties when the polyvinyl alcohol is characterized by a degree of hydrolysis of at least about 99 percent and by a 4 percent aqueous solution viscosity at 20° C. in the range of about 7.5 to 16 centipoises.

The second disadvantage in using polyvinyl alcohol as the pigment binder in coating colors is the poor print properties of the product coated therewith. Coated paper used in magazine and other advertising media must be capable of yielding a glossy surface when printed with standard inks. Glossy advertisements sell products. Deficiencies in this area, particularly when polyvinyl alcohol is used as a sole binder have long been recognized and have limited the use of polyvinyl alcohol by the paper industry.

It is known that polyvinyl alcohol has a much greater tendency than starch to migrate away from the surface of a substrate during the coating operation and, unlike starch, large discrepancies between the amount of binder remaining at the surface and in the original coating color can occur. It is also known that pigment binders such as starch and the like can be concentrated nearer the surface of the substrate by utilizing higher drying rates as evidenced by the Gallino et al., patent, infra. While Gallino et al. do not comment on the uniformity of binder migration in their patent, it is noteworthy that rapid drying as taught in such patent has never been adopted commercially to any significant extent. The primary reason therefor is that rapid drying has been found to result in non-uniform binder migration producing a mottled print appearance, called "mottle." Mottle is a variation in ink density or finish producing a spotty appearance, often referred to as "galvanized." Mottle is noticeable mainly in halftones and sometimes in solid areas. The variation in ink absorbency or gloss ink holdout is often a result of non-uniform or clumplike concentrations of the binder producing the "mottled" print appearance. This "mottle" phenomenon presents a drying rate limitation which denies to many paper people the full economic exploitation of their available equipment, since the full drying rate capacity of most paper coating equipment is not realized in present commercial practice.

SUMMARY OF THE INVENTION

The invention relates to a process for producing a coated article comprising applying to a fibrous substrate an aqueous coating composition containing a pigment filler and a binder therefor and thereafter drying said composition, the process being characterized by an improvement wherein the binder consists of water-soluble polyvinyl alcohol having a degree of hydrolysis of at least about 99 percent and a 4 percent aqueous solution viscosity at 20° C. in the range of about 7.5 to 30 centipoises and wherein the instantaneous drying rate of the constant evaporation rate period of the drying step is 5–30 lbs. water/hr. ft.$^2$.

The invention provides a significant, unexpected advantage in that it permits the obtention of mottle-free, color coated fibrous substrates at drying rates which normally produce mottle where starch or other particulate binders are employed in the color coating.

A particularly important economic advantage also attends the practice of the present invention in that drying equipment on commercial paper coating lines may be operated at full capacity, a factor not generally realized in present commercial practice because of the drying rate limitation imposed by mottle.

DETAILED DESCRIPTION OF THE INVENTION

Polyvinyl alcohol

Figure 1:
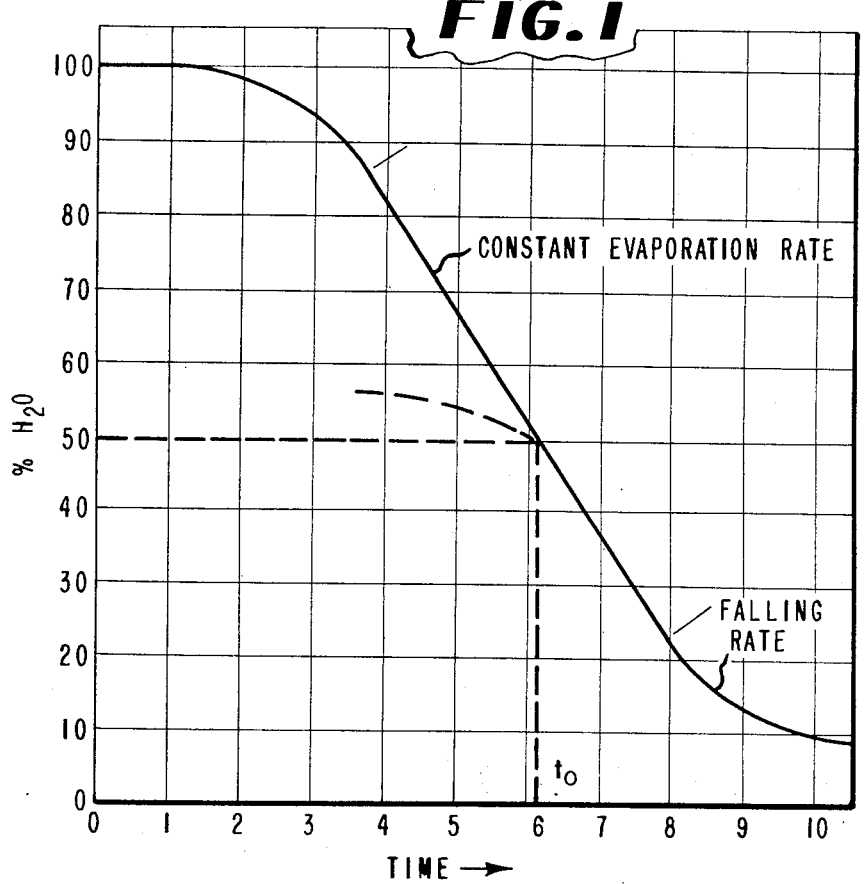
FIG. 1 is a plot of a typical reverse S drying rate curve.

As is well known, polyvinyl alcohol is prepared by the alcoholysis, saponification or hydrolysis of a polyvinyl ester such as polyvinyl acetate, so as to convert at least about 70 percent of the ester groups of the latter to hydroxyl groups. The extent to which such conversion is effected is commonly referred to as the degree of hydrolysis, which is frequently expressed as percent hydrolysis. A polyvinyl alcohol that is 99 to 100 percent hydrolyzed, i.e., 99 to 100 percent of the ester groups are converted to hydroxyl groups, is generally referred to as a fully hydrolyzed polyvinyl alcohol, while one that is hydrolyzed to a lesser extent is referred to as a partially hydrolyzed polyvinyl alcohol. Polyvinyl alcohols of various degrees of hydrolysis are available commercially in high, medium and low viscosity grades. The viscosity of a polyvinyl alcohol depends upon the degree of polymerization of the polyvinyl ester from which it was derived (the higher the degree of polymerization of the parent ester, the higher will be the viscosity of the polyvinyl alcohol).

Generally speaking, any of the commercially available polyvinyl alcohols, i.e., the high, low and medium viscosity grades of fully hydrolyzed and partially hydrolyzed polyvinyl alcohols, can be employed as pigment binders in the formulation of coating colors. In this regard, Colgan et al., infra, suggest the use of polyvinyl alcohol grades varying broadly from 55 to 100 percent hydrolysis and from 2 to 150 centipoises in viscosity, the latter measured in 4 percent aqueous solution at 20° C. While the prior art generally recognizes that specific applications might call for a particular viscosity grade or a particular degree of hydrolysis, there is no clear teaching with respect to coating color applications involving very high shear rates, e.g., of the order of $10^5$ sec.$^{-1}$.

It has been found that the full economic potential offered by modern high speed paper making machinery cannot be achieved by utilizing the more typical commercial binders, such as the natural or non-synthetic binders, e.g., starch. On the other hand, no significant improvement in rheological properties has been attributed by the prior art to the use of a synthetic binder, such as polyvinyl alcohol, in coating colors. Colgan et al., infra, merely disclose that their polyvinyl alcohol binders exhibit rheological properties typical of Newtonian and shear-thinning fluids and solids-viscosity relationships similar to colors prepared from the more typical commercial binders, no suggestion being made that any particular binder is atypical with respect to the rheology of coating colors prepared therefrom. Nippon Gosei, infra, and Kurashiki Rayon, infra, do not offer any suggestions regarding the effect of polyvinyl alcohol on the rheology of coating colors.

Barlow, in his copending patent application serial number infra, provides a significant advance in the art of color coating fibrous substrates, e.g., in the manufacture of paper and paperboard. Barlow teaches that the rheological properties of coating colors can be significantly improved by utilizing as the sole pigment binder therein polyvinyl alcohol having a 4 percent aqueous solution viscosity at 20° C. in the very narrow range of 7.5 to 16 centipoises, preferably 10 to 14 centipoises. In particular, Barlow discloses that these polyvinyl alcohols can be employed as the sole pigment binder in coating colors for the coating of cellulosic substrates, such as paper web, at high speed coating operations where the ratio of shear of the coating colors is of the order of $10^5$ sec.$^{-1}$. Accordingly, a preferred embodiment of the present invention restricts the polyvinyl alcohols employed to those employed by Barlow as his sole pigment binder and accordingly, are unique in their ability to significantly advance the shear rate level at which transition from pseudoplastic to dilatant flow is evidenced. The advance constitutes essentially a full order of magnitude since coating colors presently employed in the paper making industry experience dilatant flow generally at shear rates of the order of $10^4$ sec.$^{-1}$. This advance, to a shear rate value exceeding $1.1 \times 10^5$ sec.$^{-1}$, can be translated readily with modern high speed machinery to more practical coating operations. Alternatively, since dilatancy is a function of the solids content of coating colors, the invention permits the use of higher solids contents reflecting economies in drying procedures and equipment.

Coating colors

The use of coating colors, i.e., aqueous coating compositions, for preparing coated fibrous substrates, e.g., coated cellulosic webs, is well known in the paper and paperboard art. As indicated heretofore, coating colors conventionally comprise a pigment "slip," i.e., water and a pigment with or without other modifying adjuvants, which has been compounded with a binder or adhesive material.

A preferred pigment or filler of the slip employed is making the coating colors used in practicing the invention comprises clay. In this regard, any of the conventional clays customarily used for coating paper is suitable, including the hydrous aluminum silicates of kaolin group clays and hydrated silica clays.

In addition to clay itself, there may be utilized other paper filling compositions and materials such as, for example, calcium sulfate, titanium dioxide, blanc fixe, lithopone, zinc sulfide, zinc oxide, or other coating pigments in various ratios, e.g., up to 50 percent by weight of the clay. As previously indicated, the slip may also contain a small amount, e.g., 0.1 to 0.50, of a dispersing or stabilizing agent such as tetra-sodium pyrophosphate. The modification of the coating color using these materials will be within the knowledge of those skilled in the art.

The coating compositions, i.e., the "colors" used in practicing the present invention can be prepared by any of the several known techniques. The usual method involves separately dissolving the polyvinyl alcohol in water and then combining the resulting solution with the pigment slip.

Polyvinyl alcohol solutions may be made by adding the dry polyvinyl alcohol to well agitated water. The temperature may then be brought to 200° F. and retained there until dissolution occurs, e.g., for 20 to 30 minutes.

While it is still warm the polyvinyl alcohol solution is combined with the clay slip. Pigment "shock" can sometimes occur while preparing colors. The employment of the lowest practicable solids polyvinyl alcohol solution, the combination of slip and solution while the latter is quite hot, the addition of the slip to the polyvinyl alcohol solution (rather than the reverse order of addition), and the addition of a small amount of tetrasodium pyrophosphate to the polyvinyl alcohol solution—although not necessary procedures—all tend to minimize the possibility of shock. The addition of surfactants to the polyvinyl alcohol solution is another procedure for eliminating shock.

The relative proportions of the several components of the coating color compositions used in practicing the invention may vary to suit individual requirements, but in all cases the polyvinyl alcohol constitutes the sole binder for the clay or other filler. In general, the cating colors of the invention have the following composition:

| Component: | Parts by wt. |
|---|---|
| Pigment (e.g., clay) | 100. |
| Dispersing agent | Up to 0.5. |
| Polyvinyl alcohol (i.e., 4 percent aqueous solution viscosity at 20° C. of 7.5 to 30 centipoises, preferably 7.5 to 16 centipoises, optionally 12 to 14 centipoises) | 3 to 12. |
| Water | (1) |

[1] Sufficient to provide solids content of 35 to 60 percent by weight.

For optimum results in the coating of paper or paperboard, it is preferred to prepare a coating color having a total solids composition which is relatively high, thus providing good surface coating qualities and economical operation. A suitable range of total solids for the coating color is between about 35 and 60 percent solids with a preferred range of about 45 to 55 percent. A color composition containing an amount of total solids and the polyvinyl alcohol binder of the invention as specified is characterized by being readily applied to the surface of the paper and by forming a highly resistant coating thereon. Thus, utilizing the coating color according to this invention, there is produced a pigment coated paper which is highly satisfactory for use in printing operations, particularly letterpress operations, and is resistant to disturbance of the pigment-coating surface through rubbing, picking, and the like.

Drying technique

The coating colors employed in practicing the invention are applied to the fibrous web to be coated by any convenient means, e.g., roll coaters, air knife coaters, blade coaters. Preferably, however, they are applied by means of a coating device of the type known in the art as a trailing blade coater, in which a pool of the coating composition is maintained in the bight between a backing roll around which the paper travels, and a flexible blade, one end of which extends close to the paper on the backing roll and meters the flow of the coating composition to the paper.

As the coating colors applied to the fibrous raw stock by any of the commercially practical methods or means aforedescribed provide a coated product containing an excess of water, forced drying is essential as part of the coating process to dry and condition the coated substrate for calendering or further processing. Generally, this may be accomplished by applying heat to the web immediately after the coating has been applied by such known means as high velocity hot air impingement, high frequency dielectric field, and steam dryer. Preferably, drying is carried out by direct contact with a gas flame, as from a ribbon burner.

While rapid drying, as discussed by Gallino et al., infra, would appear to be a simple and economical expedient, the complexity of the problem requires further consideration. Should the drying technique cause the wet coating to become unduly hot, the quality of the product is impaired by bubbles, blisters, pinholes, or crazing of the coated surface. In addition, if the amount of heat applied is not controlled, excessive rates of evaporation cause overdrying of the surface coating, preventing or hindering migration of subsurface moisture by capillary action. Migration of the pigment binder is also affected by the drying technique since the presence of a water-binder matrix when drying begins is essentially in order to provide mobility and permit the binder to move toward the interface of substrate and coating for adequate bond.

Figure 2:
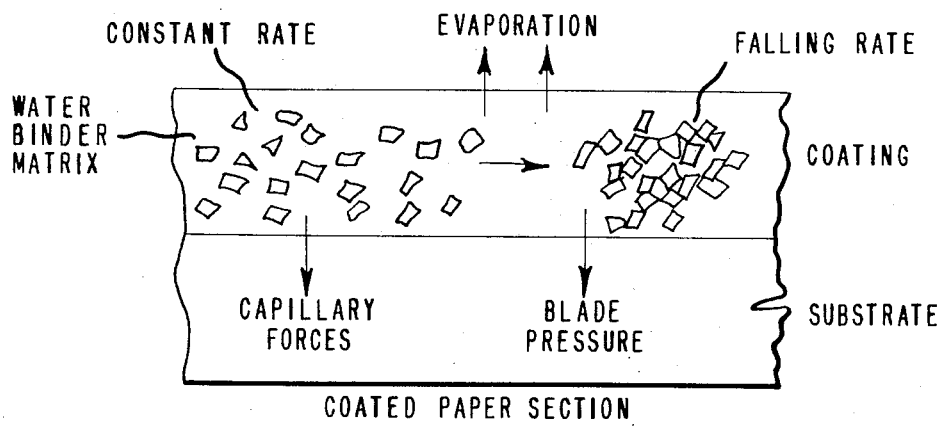
FIG. 2 is a schematic depiction of a substrate with the coating applied during the drying process.

In the course of the investigation leading to the present invention, a drying technique was determined which not only avoided the drying problems aforementioned but also avoided the imposition of the economically detrimental drying rate limitation imposed by the phenomenon of mottle. This drying technique is directly concerned with that phase of the evaporating problem known as the "constant rate period." This period is shown as the straight line section of the reverse S curve of FIG. 1. As application of the coating colors to the substrate results in an almost instantaneous loss of approximately 50 percent of the fluidizing phase to the substrate, the point $t_0$ represents the practical point in time when efforts may be started to effect a change in binder distribution. It is noted that only a very short period remains to effect such change. During this period the heat transferred by the drying technique to the surface of the cellulosic web or other fibrous substrate is quantitatively consumed in evaporating water at the temperature of the surface. This principle is based on the assumption that initial moisture concentration is uniform and sufficiently high so that the substrate surface is thoroughly wet at the start. So long as the surface is sufficiently wet, evaporation proceeds at a constant rate as indicated in FIG. 2 by the presence of a water binder matrix in the coating. Other forces influencing the coating process and involved in the mechanism of coating comprise the capillary action of the substrate and the hydrodynamic pressure of the blade. The occurrence of particle to particle contact, as shown on the right side of FIG. 2, marks by definition the onset of the "falling rate period." This is of great importance because the migration or control of binder distribution in accordance with the invention can only be effected during the constant rate period.

In the practice of the inventive process, a drying technique is employed which maintains careful control of the rate of evaporation during the constant rate period such that the instantaneous drying rate of this period is in the range of 5–30 lbs. water/hr.-ft.² This drying rate range is critical in that values below 5 lbs. water/hr.-ft.² result in unacceptable print quality. The maximum drying rate value of 30 lbs. water/hr.ft.² is based on the practical limits of commercial drying equipment.

EXAMPLES

| Number | Binder | Parts/100 pigment | Drying condition | Instantaneous drying rate, # H₂O/ hr. ft.² | Coat weight, #/3,300 ft.² | Percent solids | 75° Gardner gloss | Remarks |
|---|---|---|---|---|---|---|---|---|
| 1 | EP-9050 | 10 | Steam can with high velocity air cap. | 17 | ¹ 9.5 | 48.5 | 60 | No mottle, good print quality. |
| 2 | Penford gum 280 | 15 | ---do--- | 16 | ¹ 8.5 | 52 | 68 | Extreme mottle. |
| 3 | EP-9050 | 6 | ---do--- | 25 | ² 5.2 | 52 | 59 | No mottle, good print quality. |
| 4 | Penford gum 280 | 18 | ---do--- | 25 | ² 4.8 | 52 | 75 | Extreme mottle. |
| 5 | EP-9050 | 4 | ---do--- | 8 | ¹ 9.1 | 54 | 53 | Good halftone, no mottle, a marginal gloss ink holdout. |
| 6 | EP-9050 | 6 | High velocity air impingement. | 10.5 | ² 4.0 | 52 | 64 | Excellent halftone, no mottle. |
| 6 | EP-9050 | 6 | ---do--- | 8 | 3.8 | 52 | 62 | Do. |
| 7 | EP-9050 | 6 | ---do--- | 5 | 3.6 | 52 | 59 | No mottle, marginal print quality. |
| 8 | EP-9050 | 6 | ---do--- | 3.9 | 2.4 | 52 | 51 | No mottle, unacceptable print quality. |

¹ C-2-S.
² C-1-S.

NOTE.—C-1-S denotes coated on one side; C-2-S denotes coated on both sides; EP-9050 denotes Du Pont polyvinyl alcohol, at least about 99% hydrolyzed, 4% aqueous solution viscosity at 20° C. of 13 centipoises; Penford Gum 280 denotes Pennick & Ford starch, produced by hydroxy ethylated conversion.

We claim:

1. In a process for producing a coated article which yields mottle-free prints, said process comprising applying to a fibrous substrate an aqueous composition comprising an adhesive consisting of water-soluble polyvinyl alcohol having a degree of hydrolysis of at least about 99 percent and a 4 percent aqueous solution viscosity at 20° C. in the range of about 7.5 to 30 centipoises, and a filler and thereafter drying said composition, the improvement wherein the instantaneous drying rate of the constant evaporation rate period of said drying step is 5–30 lbs. water/hr. ft.².

2. A process according to claim 1 wherein said filler is clay.

3. A process according to claim 1 wherein the polyvinyl alcohol has a 4 percent aqueous solution viscosity at 20° C. in the range of about 12 to 14 centipoises.

4. A process according to claim 1 wherein the polyvinyl alcohol has a 4 percent aqueous solution viscosity at 20° C. in the range of about 7.5 to 15 centipoises.

5. A process according to claim 1 wherein said instantaneous drying rate is 10–25 lbs. water/hr. ft.².

6. A process according to claim 1 wherein drying is carried out by high velocity hot air impingement.

References Cited

UNITED STATES PATENTS

| | | | |
|---|---|---|---|
| 3,218,183 | 11/1965 | Fritzsching et al. | 117—155 U |
| 3,015,581 | 1/1962 | Gallino et al. | 117—119.6 |
| 3,477,970 | 11/1969 | Beeman | 117—155 U |
| 3,166,435 | 1/1965 | Meier | 117—119.6 |
| 2,554,662 | 5/1951 | Cowgill | 117—155 U |
| 2,697,669 | 12/1954 | Masterman | 117—155 U |
| 2,919,205 | 12/1959 | Hart | 117—65.2 |
| 3,076,720 | 2/1963 | Rice et al. | 117—155 U |
| 3,298,987 | 1/1967 | Colgan et al. | 117—161 UE |

WILLIAM D. MARTIN, Primary Examiner

M. SOFOCLEOUS, Assistant Examiner

U.S. Cl. X.R.

117—65.2, 155 UA, 161 UE